Feb. 16, 1937. W. A. CARTER 2,070,709
HYDRAULIC SHOCK ABSORBER
Filed March 17, 1934 4 Sheets-Sheet 2

W. A. Carter
INVENTOR
By: Marks & Clerk
Attys.

Feb. 16, 1937.   W. A. CARTER   2,070,709
HYDRAULIC SHOCK ABSORBER
Filed March 17, 1934   4 Sheets-Sheet 4

W. A. Carter
INVENTOR

By Marks & Clark
Attys.

Patented Feb. 16, 1937

2,070,709

UNITED STATES PATENT OFFICE 2,070,709

HYDRAULIC SHOCK ABSORBER

William Alfred Carter, Romford, England, assignor of three-tenths to Donald Ian Menzies Kennard and three-tenths to John Reynolds Alexander, both of London, England Application March 17, 1934, Serial No. 716,195
In Great Britain March 20, 1933

14 Claims. (Cl. 188—89)

This invention relates to shock absorbers and shock absorber systems more particularly for application to road vehicles.

Hydraulic shock absorbers in which movement of an element functioning as a vane or piston within a working chamber is adapted to displace a working fluid from the working chamber into a reservoir external to the working chamber and vice versa are known, and in such constructions it has previously been proposed to provide an outer casing which completely encloses both the working chamber and the reservoir.

One object of the invention is to provide a simple form and construction of shock absorber which can be cheaply manufactured and easily assembled and which will not be liable to develop air pockets in the working spaces or be subject to overheating of the working fluid.

A further object of the invention is to provide improved means for controlling the flow of fluid to and from the working chamber.

The invention consists in a hydraulic shock absorber or shock absorber system comprising a fluid containing working chamber, a reservoir partly enveloping and communicating with the working chamber, an element functioning as a vane or piston arranged within the working chamber and adapted to displace fluid therefrom into the reservoir and vice versa, a recuperation or fluid make-up chamber arranged above the working chamber, and a valve controlled passage interconnecting the recuperation or fluid make-up chamber with the working chamber.

Conveniently in accordance with the invention there may be provided an outer casing which completely encloses the working chamber and the recuperation or fluid make-up chamber, and the reservoir may be constituted by a space enclosed between the lower part of the working chamber and the casing, the upper limits of the space being not substantially above the level of the top of the working chamber.

Further in accordance with the invention the working space on one side of the element functioning as a vane or piston may be arranged to communicate with the reservoir through a free or unobstructed passage, while the working space on the other side of the said element may be arranged to communicate with the reservoir through a passage the effective cross sectional area of which is changed by the action of the fluid to permit a smaller rate of flow of fluid in one direction and to permit a higher rate of flow in the other direction.

The invention will be described further in detail by way of example with reference to the accompanying drawings in which:—

Figure 2 is a longitudinal vertical section of the construction illustrated in Figure 1.

Figure 3 is an elevation of a section taken along the line III—III in Figure 1.

Figure 4 is an elevation of a section taken along the line IV—IV in Figure 1.

Figures 5 and 6 are fragmentary views illustrating the construction of the recuperating ball valves.

Figure 7 is a fragmentary view illustrating the construction of the by-pass valve employed in the construction shown in the figures previously referred to.

Figure 8 is a transverse vertical section taken in a plane including the by-pass valve and filling aperture of a modified construction.

Figure 9 is a view of a section taken along the line IX—IX of Figure 8.

In the construction illustrated in Figures 1 to 7 the reference numeral 1 indicates a casting constituting the outer casing of the shock absorber within which is rotatably mounted the shaft 2 upon which is formed the rotary vane 3 which operates within the working chamber 4 which is constituted by the lower part of the interior of a cylindrical inner casing, the walls 5 of which are engaged by the outer end of the rotary vane, and are formed as a separate casting from the casting 1.

Figure 1:
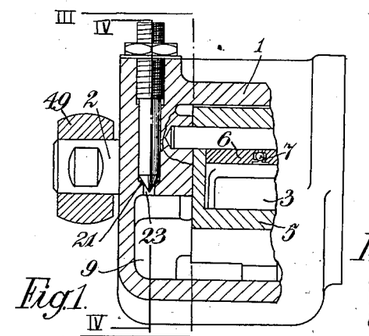
Figure 1 is a side view of one construction in accordance with the invention with part of the casing removed and sectioned along the line I—I of Figure 4 to show certain details of the interior construction.
Figures 2, 4, 6, 7, 8, 9:
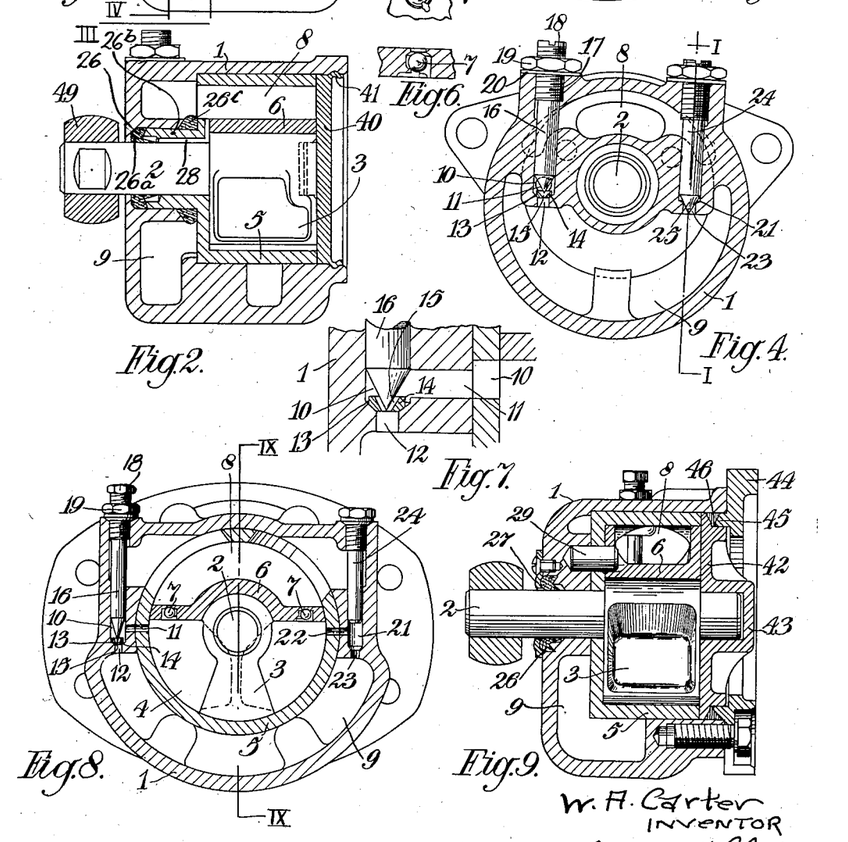

The vane may consist of one piece integral with the shaft or alternatively it may consist of a separate element fixed or held in position on the shaft, the vane being for instance made by the use of press tools.

Figures 3, 5:
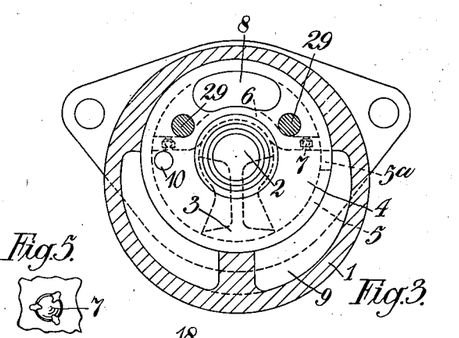

Extending across the interior of the cylindrical inner casing and forming the top of the working chamber is the wall 6 provided with recuperating ball valves 7, the construction of which is more clearly illustrated in the detail view shown in Figures 5 and 6. This wall 6 also forms the bottom wall of the recuperating space 8.

Immediately below the working chamber is the reservoir 9 which is of a large volume relative to the volume of fluid which may be displaced by movement of the rotary vane, the top wall of this reservoir being formed by the bottom wall of the working chamber and the bottom wall of the reservoir being constituted by the bottom wall of the outer casing.

The wall 5 of the inner casing (Figure 3) is formed with one or more apertures 5a forming passageways communicating between the interior of the working chamber on one side of the rotary vane and the reservoir 9.

The inner casing is provided with an aperture 10 which is of generally cylindrical form and communicates by means of the passageway 11 with the working chamber 4 and by means of the passageway 12 with the reservoir.

Each of these passageways is of smaller cross-sectional area than the cross-sectional area of the aperture 10.

At the top of the passageway 12 there is provided a seating surface 13 for the movable valve element 14 which is provided with a central aperture 15 of appreciably smaller cross-sectional area than the cross-sectional area of the passageway 12.

Co-operating with the aperture in the movable valve element is the pointed end of the tapered pin 16 which is adjustably mounted in the casing relative to the movable valve element by means of the screw threaded portions 17 thereon which engage with correspondingly screw threaded portions in the casing, the adjustment head 18, the lock nut 19, and the shim 20.

The outer casing is also formed with a further cylindrical aperture 21, which is connected by means of the passageway 23 with the reservoir.

Within the aperture 21 engages the plug 24 which is formed with a pointed end 25 adapted to enter into engagement with a seating formed at the upper extremity of the passageway 23 in such manner as normally to close the latter.

With shock absorbers of the form heretofore employed it has generally been found that filling with fluid is a long and painstaking process.

The passage 23 which functions as an air leak hole has been provided to facilitate this operation.

With the valve piece 14, tapered pin 16 and filling plug 24 (which functions as an air release pin) not in position, fluid may be poured into either the tapered pin hole or the filling plug hole both of which are freely connected with the recuperating and reservoir spaces, by means of the passageways 10, 12 and 23.

As fluid is fed into the casing, air inside will be forced out without need of any pumping action which in general is found to be necessary in known types of construction where no air leak is provided.

A fluid tight packing ring 26 housed between an inwardly directed portion 26a of the casing 1 and the end of a tubular extension 26b on the inner casing engages about the shaft 2.

The fluid tight packing ring 26 is arranged within a space which communicates by means of the passageway 28 with the recuperating space 8, a further fluid tight packing ring 26c being provided on the extension 26b on the cylindrical inner casing through which the rotary shaft 2 passes, this ring being provided to assist in preventing leakage, and being of a comparatively pliable nature which will not hinder the assembly of the various parts in position.

Figure 23:
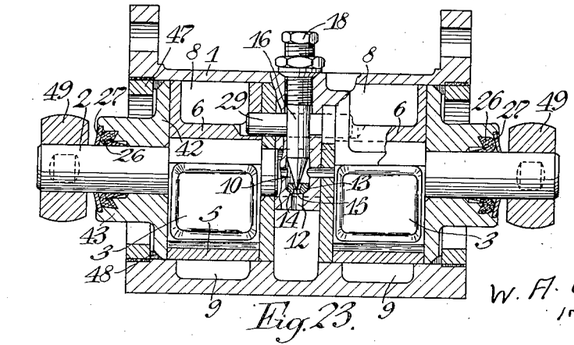
Figure 23 illustrates a twin back to back construction with operating vane shafts in alignment.

In the construction under consideration the wall 6 is secured within the working chamber by means of two dowels 29 which also serve to retain the working chamber in position within the casing. The outer casing is sealed by means of the end plate 40 the periphery of which is formed with an outwardly directed flange 41 having a convex outer surface which is pressed into a correspondingly formed groove in the adjacent parts of the outer casing. For operating the device there is arranged on the rotary shaft 2 a lever 49 although it is to be noted that shock absorbers in accordance with the invention may employ more than one operating lever, for instance two, one being arranged at one end of the rotary vane spindle and the other at the opposite end of the spindle, such an arrangement being more particularly applicable to twin type constructions such as are illustrated in Figure 23 subsequently to be described. A suitable flange is provided for attaching the shock absorber to vehicle axles or frames or to any other construction. In the remaining figures of the drawings there are illustrated alternative constructions in which for convenience and conciseness of description parts or components corresponding with like parts in the construction illustrated with reference to Figures 1 to 7 inclusive are indicated by like reference numerals to those used on the said Figures 1 to 7, the description with reference to the alternative constructions being directed more particularly to features not incorporated in or differing from the features of construction of the embodiment of the invention shown in the figures above described.

In the construction illustrated in Figures 8 and 9 the passage-way 22 connects the aperture 21 with the working chamber of the device and the plug 24 instead of being provided with a pointed end as shown in the case of the construction illustrated in Figures 1 to 7 is formed with a plain end. Moreover in this construction the fluid tight packing ring 26 is retained in position by means of an end plate 27 which is secured to the casing 1 by means of screws.

The end closure in this construction is in the form of a plate 42 formed with a boss 43 constituting a bearing for the rotary shaft 2, this plate being secured in position within the end of the casing by means of the clamping plate 44 which is provided with a circular flange 45 between which and the plate 42 there is arranged the packing ring 46.

Figures 10, 11, 12, 13, 14:
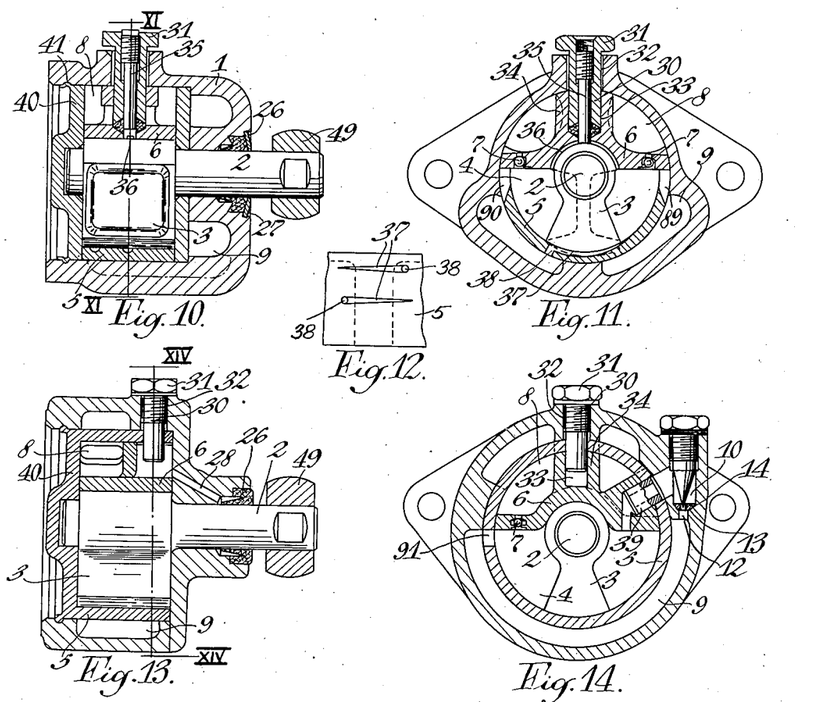
Figure 10 is a longitudinal vertical section of a further construction in accordance with the invention.
Figure 11 is a view of a section taken along the line XI—XI of Figure 10.
Figure 12 is a fragmentary view illustrating part of the inner surface of the working chamber of the construction illustrated in Figures 10 and 11.
Figure 13 is a longitudinal vertical section of a still further construction in accordance with the invention.
Figure 14 is a view of a section taken along the line XIV—XIV of Figure 13.

In the construction illustrated in Figures 10, 11 and 12 the wall 6 is secured within the working chamber by means of the plug 30 provided with an adjusting head 31 and passing through an aperture 32 formed in the outer casing and a further aperture 33 which is formed co-axially therewith in an upstanding portion 34 formed on the wall 6. When the plug 30 is removed, oil for filling the casing may be poured in through the aperture 33. In the plug 32 there is provided means for adjusting the passage of fluid from one side of the rotary vane 3 to the other, such means consisting of a pin 35 within the plug the lower extremity of which abuts against the top surface of the rotary vane and co-operates with a groove 36 formed in the underneath surface of the wall. It is to be understood that this pin and groove adjustment may also if desired be employed as an auxiliary valve for other constructions of shock absorbers within the scope of the invention for instance, such as are illustrated in the other figures of the drawings. In Figures 10 and 11 there is also illustrated the position of grooves 37 in the surface of the wall of the working chamber which co-operates with the rotary vane, these grooves being formed with passages 38 which communicate with the reservoir 9. The forms of the grooves are illustrated more clearly in plan view in Figure 12 and it may be mentioned that the length from the thin end of one groove to the thin end of the other groove should be slightly longer than the surface of the rotary vane. Passageways 89, 90 respectively inter-connect the working chamber upon either side of the piston element 3 with the reservoir 9. A shock absorber as illustrated and described with reference to Figures 10, 11 and 12 is particularly suitable for use as a steering damper.

In the construction illustrated in Figures 13 and 14 a similar arrangement to that shown in Figures 10 and 11 and indicated by like reference numerals is employed for securing the wall 6 in position and the wall 6 instead of being provided with two recuperating ball valves is formed with a single valve only, while in place of the other ball valve there is provided in the side wall a passage 39 communicating with the cylindrical aperture 10. Moreover a single passageway 91 only is provided between the working chamber and the reservoir, and grooves 37 such as above described are not employed in this construction. Furthermore the plate 40 is formed integrally with the wall 5 of the working chamber whereas in the constructions previously described the back plate is formed separately from the said wall.

Figure 15:
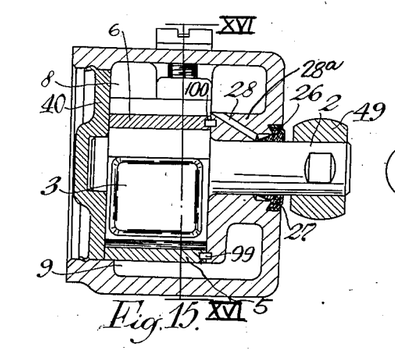
Figure 15 is a longitudinal vertical section of a still further construction in accordance with the invention.
Figure 16:
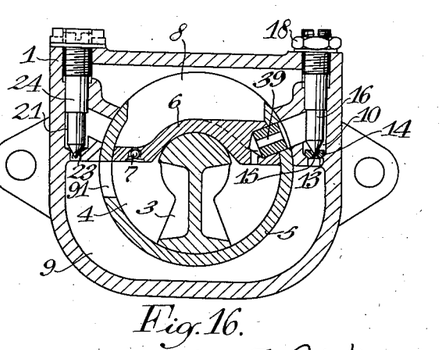
Figure 16 is a view of a section taken along the line XVI—XVI of Figure 15.

The construction illustrated in Figures 15 and 16 is in principle generally similar to the construction illustrated with reference to Figures 1 to 7 but in this construction the outer casing instead of being cylindrical is of the form shown more clearly in Figure 16 while the passageway 28 instead of being formed in a tubular extension on the inner casing is provided in an inwardly directed tubular extension 28a on the outer casing, no tubular extension corresponding with that indicated by the reference numeral 26b in Figure 2 being provided. The working chamber in this construction consists therefore of a plain substantial semi-cylindrical casing which is bounded on its bottom side by the wall 5, on its top side by the wall 6 and on its ends by the plate 40 and the end of the inwardly directed tubular extension 28a on the outer casing. It will also be noted that as in the case of constructions illustrated in Figures 13 and 14 in place of one of the ball valves in the wall 6 there is provided a passageway 39 communicating with the cylindrical aperture 10, and a single passageway 91 communicates between the working chamber on one side of the piston element and the reservoir. The working chamber 5 and the wall 6 are secured against movement within the casing by means of dowels 99, 100.

Figures 17, 20:
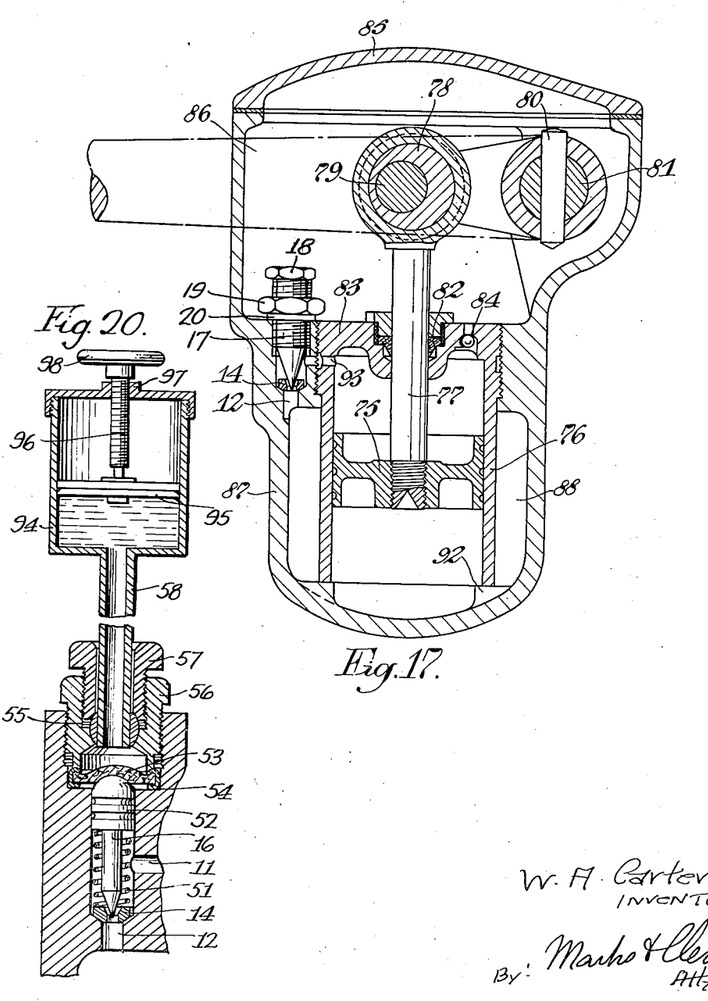
Figure 17 is a vertical section of a modified construction in which the movable element is a piston.
Figures 18, 19, 20 and 21 illustrate alternative forms of construction of by-pass valves.

In the construction illustrated in Figure 17 the movable element consists of a piston 75 working within the cylinder 76 and secured to one end of a connecting rod 77 the other end of which is mounted upon an eccentric 78 on the crank 79 which is connected by means of the pin 80 with the shaft 81 connected with the operating lever of the device. The connecting rod passes through a packing 82 secured in the top wall 83 of the cylinder which is provided with a recuperating ball valve 84. Included between the wall 83 and the top cover plate 85 is the reservoir 86 within which the eccentric crank and operating shaft are housed. The cylinder itself is housed within a casing 87 between the vertical walls of which and the walls of the cylinder there is included an auxiliary working space 88 which partly surrounds the cylinder. Communicating with the auxiliary space and with the top part of the working chamber constituted by the interior of the cylinder is a by-pass valve generally of the form described with reference to Figures 1 to 7, similar reference numerals to those used in the said figures being used to denote the various parts of the said by-pass valve. The reference numeral 93 indicates a passage leading from the working chamber into the body of the by-pass valve.

Figure 22:
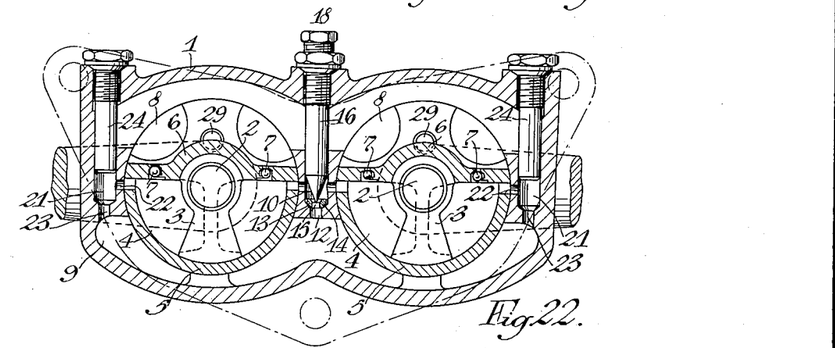
Figure 22 illustrates a twin side by side construction with operating vane shafts parallel to each other.

With the constructions illustrated in Figures 22 and 23 a single by-pass valve is employed in association with a plurality of individual shock absorbers comprised in a single unitary structure, the form of the working chambers, reservoirs, fluid make-up chambers and valves being generally similar to and indicated by like reference numerals to those employed in Figures 1 to 7. As shown, one of such valves is formed common to two rotary vane systems but it is to be understood that if desired one regulating valve may be used to each rotary vane system. It will further be seen that in the construction illustrated in Figure 23 the end plate 42 is secured within the outer casing by means of the plate 47 which engages directly against the packing ring 48 located between it and the outer edge of the plate 42. The form of construction illustrated in these figures is particularly adapted for use in four wheel bogey systems, outboard mountings, transverse mountings and for heavily loaded vehicles.

Shock absorbers in general offer adjustable resistance to the tendency of shock to move the operating lever or levers when fitted to a movable vehicle.

It will be understood that on some roads of smooth surface the ordinary vehicle suspension is capable of giving the best riding comfort to the load carried and it is therefore undesirable to resist this action under such conditions.

The invention provides for this in that suitable grooves, holes or valves may be used in shock absorbers so that little or no resistance is offered to small undulating road surface shocks and only a greater or faster thrust on the operating lever will be resisted.

Also for pot holes in the road it is undesirable for the shock absorber to resist the tendency of wheels to go down into them and the invention provides that grooves, holes or valves suitably placed will allow this movement to take place.

Reference has already been made to one form of by-pass valve which may be employed in accordance with the invention and further reference will now be made to modified forms illustrated in Figures 18, 19, 20 and 21 which may be used in substitution therefor or more generally in other forms of hydraulic shock absorber than those illustrated.

Figure 19:
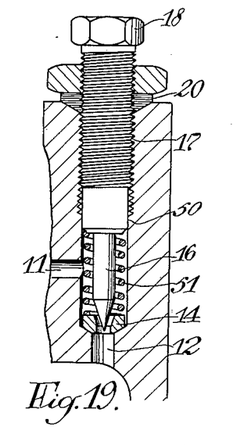

The construction illustrated in Figure 19 only differs in principle from that above described in that between the shoulder 50 on the tapered pin 16 and the movable valve element 14 there is arranged a spring 51 which urges the valve element resiliently on to its seating and enables abnormal shocks dealt to the shock absorber to be progressively dealt with by the valve.

A similar spring for a like purpose is also provided in the construction illustrated in Figure 20 but in this case the tapered pin 16 is provided at its uppermost extremity with a piston or plunger 52, the top surface of which engages against the diaphragm 53 formed of rubber or other material which is secured between the shoulder 54 formed at the base of an aperture 55 in the casing, and the bottom end of the screw threaded plug 56 by means of which the end of the conduit 58 is secured in position above the diaphragm.

The conduit is connected at its upper extremity with the cylinder 94 within which is arranged the piston 95 engaging with the end of the spindle 96 which is in screw threaded engagement with the boss 97 on the cylinder casing and is provided with an operating handle 98. The conduit and cylinder are filled with a suitable fluid which may be compressed by appropriate rotation of the handle 98 so as to cause the diaphragm to operate the piston or plunger 52 to any desired extent and thus cause any required restriction of the area of the hole in the valve piece 14 by the end of the tapered pin to be effected.

A valve of this character is more particularly adaptable for use in shock absorbers where a system of remote control of the shock absorber is called for.

Figure 18:
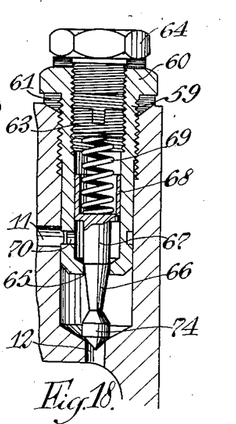
Figure 21:
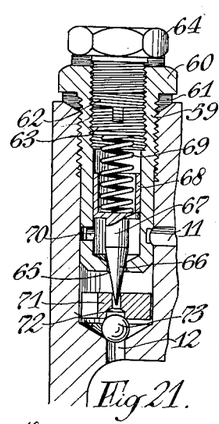

Figures 21 and 18 illustrate designs of self adjusting valves which when the fluid viscosity is changed due to variations of temperature automatically operate so that an equal resistance by the shock absorber is promoted notwithstanding variations of viscosity.

This result is obtained by allowing a valve to open due to fluid pressure, allowing the fluid to pass and having above the valve a hole restricted by a pin operated by movement of the valve, this pin being of such size and shape that only the same amount of fluid is allowed to pass for any variation of valve lift.

In each of the constructions illustrated in Figures 21 and 18 there is provided a hollow plug 59 entering into screw threaded engagement with a hole in the casing and provided with an adjusting head 60 between which and the adjacent surface of the casing the element 61 which functions both as a shim and as a fluid-tight packing is included.

The upper part of the interior surface of the plug 59 is formed with a screw threaded portion 62 with which is engaged the slotted plug 63 and the screw threaded closure 64.

The lower part of the hollow plug is formed with an aperture 65 through which projects the tapered pin 66 formed on a stem 67 provided at its upper extremity with an upstanding peripheral flange 68, forming a housing for the lower end of the spring 69, the upper end of which engages with the underneath surface of the slotted plug.

The hollow plug is furthermore provided with an aperture 70 communicating with the passage 11.

In the construction illustrated in Figure 21 the tapered pin enters at its lower extremity into engagement with the valve piece 71 formed with an aperture 72 between the lower end of which and a seating on the top of the passageway 12 the ball 73 is located.

In the construction illustrated in Figure 18 the tapered pin is formed at its lower extremity integrally with the head 74 which seats directly on the end of the passageway 12.

With the construction illustrated in Figures 1 to 7, if the vane is rotated in an anti-clockwise direction fluid will be displaced out of the working chamber through the passageway 5a into the reservoir where it will mix with a relatively large volume of relatively cool oil which will operate to maintain the fluid at an even temperature. At the same time fluid will be drawn from the reservoir into the working chamber through the passageways 12 and 10, the flow of fluid in this direction operating to raise the valve piece 14 from its seating to permit a relatively high rate of flow of fluid into the passageway 10. If the vane is rotated in a clockwise direction fluid is drawn into the working chamber through the passageway 5a, and further fluid is expelled from the working chamber into the reservoir through the passageways 10 and 12, the action of fluid flowing in this direction being to force the valve piece 14 down on to its seating thereby obstructing the flow of fluid from the passageway 10 into the passageway 12 in accordance with the size of the aperture 15 in the valve piece. The device operates therefore to oppose a relatively high resistance to rotation of the vane in one direction and a relatively low resistance to movement thereof in the opposite direction. The ball valves 7 in the wall 6 operate only to permit replenishment of fluid from the recuperating chamber into the working chamber, and maintain the latter full of fluid without permitting the accumulation therein of air.

The construction illustrated in Figures 8 and 9 operates in a like manner to that above described, anti-clockwise movement of the vane displacing fluid through the passageways 22, 23 into the reservoir, drawing fluid into the working chamber from the reservoir through the passageways 12, 11 (valve piece 14 being lifted by the fluid flow in this direction), and clockwise movement of the vane drawing fluid into the working chamber from the reservoir through the passageways 23, 22, and displacing fluid out of the working chamber into the reservoir through passageways 11, 12 (this movement as before forcing the valve piece on to its seating).

With the construction illustrated in Figures 10, 11 and 12, anti-clockwise movement of the vane displaces liquid out of the working chamber into the reservoir through the opening 89 and fluid is at the same time drawn into the working chamber from the reservoir through the opening 90. It will furthermore be noted that such movement progressively uncovers the grooves 37. Upon movement of the vane in the opposite direction the oil flow is reversed, but it will be seen that the action in each direction of movement will be the same though in the opposite sense. Fluid flow from one side of the vane to the other is in this construction permitted to a limited extent through the groove 36, the effective cross-sectional area of which may be adjusted by means of the pin 35.

The constructions illustrated in Figures 13, 14, 15 and 16, operate upon similar principles to that illustrated in Figures 1 to 7, anti-clockwise movement of the vane displacing fluid into the reservoir through the passageways 3, 9, 10, 12, (valve piece 14 being forced on to its seating by the fluid flow in this direction) and drawing fluid from the reservoir into the working chamber through the aperture 91, while clockwise movement of the vane displaces fluid into the reservoir through the aperture 91 and draws fluid from the reservoir into the working chamber through the passageways 12, 10, 39 (valve piece 14 being forced off its seating by the fluid flow in this direction).

The construction illustrated in Figure 17 operates in the following manner:—Downward movement of the piston 75 displaces fluid out of the working chamber 76 into the reservoir 88 through the passageways 92 and at the same time draws fluid from the reservoir into the working chamber through the passageways 12, 93 (valve piece 14 being forced off its seating by the fluid flow in this direction) while upward movement of the piston draws fluid from the reservoir into the working chamber through the passageways 92 and at the same time displaces fluid from the working chamber into the reservoir through the passageways 93, 12 (valve piece 14 being forced on to its seating by the fluid flow in this direction).

In the construction illustrated in Figures 22 and 23, a single by-pass valve governs the operation of two rotating vane systems arranged upon either side thereof. With such a construction as in the case of certain other constructions above described, fluid flow to and from the working chambers is governed by the position of the movable valve piece 14.

It is to be understood that the expression "recuperating chamber" as used herein refers to the chamber from which the supply of fluid to the working chamber is made up or replenished, and that the expression "reservoir" refers to the chamber into which fluid is displaced and from which fluid is withdrawn by movement of the movable element.

Having now described my invention, what I claim as new and desire to secure by Letters Patent is:

1. A hydraulic shock absorber comprising an outer casing, a liquid containing working chamber arranged within said casing, a reservoir partly enveloping and forming a jacket for the working chamber, passages for liquid interconnecting the working chamber and the reservoir, a piston element arranged within the working chamber and adapted to displace liquid therefrom into the reservoir and vice versa, a liquid make-up chamber above the working chamber, a dividing wall extending between the working chamber and the liquid make-up chamber, a recessed portion formed in the said dividing wall, an aperture in the outer casing in alignment with the said recessed portion, and a filling plug extending through the said aperture and engaging with the recessed portion whereby the working chamber is secured in position within the outer casing.

2. A hydraulic shock absorber comprising an outer casing, a liquid containing working chamber arranged within said casing, a reservoir partly enveloping and forming a jacket for the working chamber, passages for liquid interconnecting the working chamber and the reservoir, a piston element arranged within the working chamber and adapted to displace liquid therefrom into the reservoir and vice versa, a liquid make-up chamber above the working chamber, a dividing wall extending between the working chamber and the liquid make-up chamber, a recessed portion formed in the said dividing wall, an aperture in the outer casing in alignment with the said recessed portion, a hollow plug extending through the said aperture and engaging with the recessed portion whereby the working chamber is secured in position within the outer casing, in the dividing wall a groove which extends from that part of the working chamber on one side of the piston element to that part of the working chamber on the other side of the piston element, and an adjustable pin engaging within the hollow plug and co-operating with the said groove whereby control of liquid flow from one side of the piston element to the other side thereof may be effected.

3. A hydraulic shock absorber comprising an outer casing, a liquid containing working chamber arranged within said casing, a reservoir partly enveloping and forming a jacket for the working chamber, passages for liquid interconnecting the working chamber and the reservoir, a piston element arranged within the working chamber and adapted to displace liquid therefrom into the reservoir and vice versa, a liquid make-up chamber above the working chamber, a dividing wall extending between the working chamber and the liquid make-up chamber, a recessed portion formed in the said dividing wall, an aperture in the outer casing in alignment with the said recessed portion, a hollow plug extending through the said aperture and engaging with the recessed portion whereby the working chamber is secured in position within the outer casing, in the dividing wall a groove which extends from that part of the working chamber on one side of the piston element to that part of the working chamber on the other side of the piston element, an adjustable pin engaging within the hollow plug and co-operating with the said groove whereby control of liquid flow from the one side of the piston element to the other side thereof may be effected, tapered grooves formed on the inner surface of the working chamber, and passages interconnecting the said tapered grooves with the reservoir.

4. A hydraulic shock absorber comprising a liquid containing working chamber, a reservoir partly enveloping and forming a jacket for the working chamber, a piston element arranged within the working chamber and arranged to displace liquid therefrom into the reservoir and vice versa, a passage for liquid connecting that part of the working chamber on one side of the piston element with the reservoir, a further passage for liquid connecting that part of the working chamber on the other side of the piston element with the reservoir, means associated with the second-mentioned passage for causing the effective cross sectional area of the same to be changed by the action of the liquid to permit a relatively small rate of flow of liquid through the said passage in one direction and a higher rate of flow of liquid through the said passage in the opposite direction, a liquid make-up chamber above the working chamber, and a valve controlled passage interconnecting the liquid make-up chamber with the working chamber.

5. A hydraulic shock absorber comprising a liquid containing working chamber, a reservoir partly enveloping and forming a jacket for the working chamber, a piston element arranged within the working chamber and adapted to displace liquid therefrom into the reservoir and vice versa, a passage for liquid connecting that part of the working chamber upon one side of the piston with the reservoir, a further passage for liquid connecting that part of the working chamber on the other side of the piston with the reservoir, a valve seating within the further passage, a movable valve piece of substantially smaller cross sectional area than the said further passage co-operating with the seating, an aperture in the said valve piece, a tapered pin normally spaced apart from the said valve piece and adapted to co-operate with the aperture therein, whereby as a consequence of liquid flow in one direction the valve piece is forced down upon its seating so as to limit the liquid flow to a rate determined by the size of the said opening therein, and as a consequence of liquid flow in the opposite direction the valve piece is forced off its seating so that the said aperture is obturated by the tapered pin and a relatively larger flow of liquid through the passage is permitted, a liquid make-up chamber above the working chamber, and a valve controlled passage interconnecting the liquid make-up chamber with the working chamber.

6. A hydraulic shock absorber as claimed in claim 5 comprising means whereby the said tapered pin may be adjusted relative to the valve piece.

7. A hydraulic shock absorber as claimed in claim 5 comprising means for effecting remote control of the position of the tapered pin relative to the valve piece.

8. A hydraulic shock absorber as claimed in claim 5 comprising liquid operated means for effecting remote control of the position of the tapered pin relative to the valve piece.

9. A hydraulic shock absorber as claimed in claim 5 comprising a plunger operatively connected with the tapered pin, a diaphragm co-operating with the plunger, and means whereby liquid pressure may be communicated to the said diaphragm for the purpose of effecting remote control of the position of the tapered pin relative to the valve piece.

10. A hydraulic shock absorber as claimed in claim 5 comprising in association with the valve piece resilient means for urging the same on to its seating.

11. A hydraulic shock absorber comprising a liquid containing working chamber, a reservoir partly enveloping and forming a jacket for the working chamber, passages for liquid interconnecting the working chamber and the reservoir, a piston element arranged within the working chamber and adapted to displace liquid therefrom into the reservoir and vice versa, a liquid make-up chamber above the working chamber, a valve controlled passage interconnecting the liquid make-up chamber with the working chamber, a passage for liquid connecting that part of the working chamber on one side of the piston element with the reservoir, a further passage for liquid connecting that part of the working chamber upon the other side of the piston element with the reservoir, a valve seating in the said further passage, a further valve seating within said passage spaced apart from the first-mentioned valve seating, a valve element provided with a conical surface co-operating with the first-mentioned valve seating and a further conical surface co-operating with the second-mentioned valve seating, and resilient means for urging the said valve element in a direction adapted to cause each of the said conical surfaces to engage with its corresponding valve seating.

12. A hydraulic shock absorber comprising a liquid containing working chamber, a reservoir partly enveloping and forming a jacket for the working chamber, passages for liquid interconnecting the working chamber and the reservoir, a piston element arranged within the working chamber and adapted to displace liquid therefrom into the reservoir and vice versa, a liquid make-up chamber above the working chamber, a valve controlled passage interconnecting the liquid make-up chamber with the working chamber, a passage for liquid connecting that part of the working chamber upon one side of the piston element with the reservoir, a further passage for liquid connecting that part of the working chamber upon the other side of the piston element with the reservoir, a valve seating in said second-mentioned passage, a further valve seating in said further passage spaced apart from the first-mentioned valve seating, a ball engaging against the first-mentioned seating, a movable valve piece arranged above and co-operating with the said ball, an aperture adjacent to the centre of said movable valve piece, a tapered valve element having a conical surface one part of which is adapted to co-operate with the aperture in the movable valve piece and the other part of which is adapted to co-operate with the second-mentioned valve seating, and resilient means adapted to urge the said valve element to a position in which the said parts of the conical surface engage respectively with the aperture in the movable valve piece and the second-mentioned valve seating.

13. A hydraulic shock absorber comprising a liquid containing working chamber, a reservoir partly enveloping and forming a jacket for the working chamber, a piston element arranged within the working chamber, a passage interconnecting the reservoir with that part of the working chamber on one side of the piston, a further passage interconnecting the reservoir with that part of the working chamber on the other side of the piston, a liquid make-up chamber arranged above the working chamber and isolated from direct communication with the reservoir, a passage between the liquid make-up chamber and the working chamber, and a valve associated with the last mentioned passage which normally precludes the movement of liquid from the working chamber into the liquid make-up chamber.

14. A hydraulic shock absorber comprising a liquid-containing working chamber, a reservoir partly enveloping and forming a jacket for the working chamber, a piston element arranged within the working chamber, a passage interconnecting the reservoir with that part of the working chamber on one side of the piston, a further passage interconnecting the reservoir with that part of the working chamber on the other side of the piston, a liquid make-up chamber arranged above the working chamber and isolated from direct communication with the reservoir, a passage between the liquid make-up chamber and the working chamber, a valve associated with the last mentioned passage which normally precludes the movement of liquid from the working chamber into the liquid make-up chamber a body of liquid within and completely filling the working chamber, a further body of liquid within and completely filling both the reservoir and the passages leading therefrom to the working chamber, and a still further body of liquid in the liquid make-up chamber.

WILLIAM ALFRED CARTER.